US005367628A

United States Patent [19]

Ote et al.

[11] Patent Number: 5,367,628

[45] Date of Patent: Nov. 22, 1994

[54] MULTI-WINDOW SYSTEM AND DISPLAY METHOD FOR CONTROLLING EXECUTION OF AN APPLICATION FOR A WINDOW SYSTEM AND AN APPLICATION FOR A NON-WINDOW SYSTEM

[75] Inventors: Ichiro Ote, Yokohama; Masataka Okayama, Kawasaki; Makoto Sano, Yokohama; Masanori Hashio, Isehara; Katsuya Takanashi, Hadano; Jun Kitahara, Yokohama; Sunao Hirata, Seto, all of Japan

[73] Assignee: Hitachi, Ltd., Tokyo, Japan

[21] Appl. No.: 961,393

[22] Filed: Oct. 15, 1992

[30] Foreign Application Priority Data

Oct. 15, 1991 [JP] Japan ................................ 3-266367

[51] Int. Cl.⁵ ................................ G06F 15/20

[52] U.S. Cl. ................................ 395/162; 395/157; 395/164; 345/119

[58] Field of Search ................................ 395/157, 162–166, 395/700, 500; 345/119, 120, 185, 201

[56] References Cited

PUBLICATIONS

Jon Udell "Three's the One", BYTE, Jun. 1990, pp. 122–128.

Ray Duncan, "Microsoft Windows/386: Creating a Virtual Machine Environment", Microsoft Systems Journal, Sep. 1987, pp. 1–11.

R. F. Ferraro, "Programmer's Guide to the EGA and VGA Cards, " Addison–Wesley, pp. 8–13 & 596–601.

*Primary Examiner*—Dale M. Shaw
*Assistant Examiner*—Kee M. Tung
*Attorney, Agent, or Firm*—Antonelli, Terry, Stout & Kraus

[57] ABSTRACT

A multi-window system in multi-window environment includes a CPU for executing an application program for a window system and an application program for a non-window system for producing a display using the whole display screen, a standard-resolution display hardware for the non-window system, a high-resolution display system for the window system, and a window display component for displaying a picture of the application program for the non-window system corresponding to the standard-resolution hardware in window. High-speed graphics display of an existing application program can be attained in the window. The entire display picture of the existing application program can be displayed in the window at one time and the application program can be operated without scrolling thereof.

12 Claims, 12 Drawing Sheets

MULTI-WINDOW SYSTEM AND DISPLAY METHOD FOR CONTROLLING EXECUTION OF AN APPLICATION FOR A WINDOW SYSTEM AND AN APPLICATION FOR A NON-WINDOW SYSTEM

BACKGROUND OF THE INVENTION

The present invention relates to a multi-window display control for operating an existing application program for a non-window system in parallel with an application program for a window system in the window system of a personal computer and a work station.

A multi-window system and a color graphics system are disclosed in papers of Jon Udell, "Three's the One", BYTE, June 1990, pp. 122–128, Ray Duncan, "Microsoft Windows/386: Creating a Virtual Machine Environment", MICROSOFT SYSTEMS JOURNAL, September 1987, pp. 01–11, and R. F. Ferraro, "Programmer's Guide to the EGA and VGA Cards", Addison-Wesley, pp. 8–13 and 596–601.

Recently, in order to improve the user interface, many personal computers and work stations introduce a window system, as a basic software, in which a plurality of windows are displayed on a display screen by the graphics and a plurality of application programs can be operated on the windows by a pointing device such as a mouse.

The application program for the window system in which the graphics function provided by the window system is used to make display in one window is different than the existing application program for the non-window system which uses an operating driver of the operating system or directly accesses display hardware to display text or graphics on the whole display screen, therefore the application program for the non-window system is usually not operated on the window system. Thus, software properties such as current application programs and user's software for the non-window system accumulated from the advent of the personal computer and the work station cannot be utilized in the window system.

Thus, in the window system that places importance on interchangeability, in order to operate an existing application program on the window system in the same manner as the application program for the window system, the multi-window display in the window system is made by physical display hardware. Meanwhile access to the display hardware from the application program for the non-window system in which display is made on the whole display screen adopts a method in which a virtual VRAM established in a main memory is used to emulate the physical display hardware. Accordingly the application program for the non-window system is operated in the window system and contents in the virtual VRAM are further periodically transferred and displayed by the graphics function of the window system so that operation is made as if the application program for the non-window system is displayed in the window.

The emulation of the display hardware requires an emulation process of hardware for writing in the VRAM data from a CPU which emulates access to the display hardware from the CPU and an emulation process for emulating hardware for displaying data established in the VRAM. Further, the display hardware includes text display hardware for displaying text, and graphics display hardware for displaying graphics.

In the text display, since access to the VRAM is made in the same manner as the usual access to the main memory, it is not necessary to emulate the access to the VRAM with respect to the virtual VRAM, and therefore emulation of the CPU can be easily made. Further, character codes and attributes written in the VRAM are periodically taken out by an application program or a display driver and a text is developed or expanded in the window by means of the graphics function of the window system, so that emulation of the display hardware can be made relatively easily.

On the other hand, it is relatively easy in the same manner as in the text display to develop graphics data developed in the VRAM by means of the graphics function of the window system and emulate the display hardware. Meanwhile emulation of the CPU hardware requires complicated control and practical display performance cannot be ensured since the CPU hardware adopts a VRAM having a plane structure in which a plurality of sets of memories are assigned to the same address in accordance with the number of colors, and the CPU can access the memories corresponding to the colors simultaneously in order to make drawing such as painting-out at high speed.

Accordingly, heretofore, display in the window of the application program for the non-window system is often limited to an application program using only the text display hardware.

Still another problem is that when the application program for the non-window system displays data in the window of the window system, space for a window frame is required, and accordingly a display size is made smaller than the whole display screen even if a user area of its window is expanded to the maximum size. In this case, since the whole display screen of the application program for the non-window system in which the whole display screen is used for display cannot be displayed in the window at one time, it is necessary to operate the application program while frequently scrolling the display and there is a problem that operativity is deteriorated.

SUMMARY OF THE INVENTION

It is an object of the present invention to display a part or all of an application program for a non-window system corresponding to a standard-resolution display hardware in a window of a window system operated by high-resolution display hardware.

It is another object of the present invention to provide a multi-window display capable of displaying not only a text but also graphics at high speed in a window.

It is a further object of the present invention to provide a display system in which an existing application program for a non-window system can access standard-resolution display hardware even if the display is made by graphics display hardware, so that an emulation process of a CPU requiring complicated control is not required and high-speed graphics display can be realized in a window.

It is still another object of the present invention to provide a window display in which since an application program for a non-window system corresponding to a standard-resolution display hardware is displayed in a window established in a high-resolution display hardware, the whole display screen can be displayed in the window at one time and the application program can be operated without scrolling thereof to improve the operativity.

It is a still further object of the present invention to provide a window display capable of displaying data produced by an existing application program for a non-window display in a window without modification of the existing application program.

In order to achieve the above objects, in a multi-window display method according to the present invention which is directed to a multi-window display method in multi-window environment, an application program (hereinafter referred to as AP) for a window system and an AP for a non-window system, in which the whole display screen is used to make a display, are executed in parallel, and a part or all of a display screen of the AP for the non-window system corresponding to a standard-resolution display hardware is displayed in a window of the window system operated by high-resolution display hardware.

When a window system program and an AP for a window system which are operated in the high-resolution display hardware access display hardware, the access is adapted to be made to the high-resolution display hardware, while when an AP for a non-window system accesses to the display hardware, the access is adapted to be made to the standard-resolution display hardware, so that the window system and the AP for the window system operated in the high-resolution display hardware and the AP for the non-window system operated in the standard-resolution hardware are executed in parallel.

The window system according to the present invention for executing an AP for an window system and an AP for a non-window system, comprises: a CPU for executing the AP for the non-window system; the AP for the window system and a window system program; high-resolution display hardware corresponding to the AP for the window system; standard-resolution display hardware corresponding to the AP for the non-window system; a CPU selection circuit for selecting any one of both the display hardwares to be accessed by the CPU; first display hardware selection means for controlling the CPU selection circuit; a display common to both the display hardwares; a display selection circuit for supplying an output of either one of the display hardwares to the display independent of the selection operation of the CPU selection circuit; second display hardware selection means for controlling the display selection circuit, and window display means for causing the AP for the non-window system to access to the standard-resolution display hardware to periodically transfer and display the display data in a window of the window system being operated by the high-resolution display hardware.

The second display hardware means displays the output of the high-resolution display hardware in the display at all times according to the display selection circuit regardless of control of the first display hardware selection means when the window system is displayed.

In the present invention, the high-resolution hardware display is utilized in order to display the window system itself and the AP for the window system, and the standard-resolution display hardware which is standardized heretofore in the personal computer or the like is utilized in order to display the existing AP for the non-window system.

The first display hardware selection means is controlled by an AP scheduler when the AP scheduler for switching the AP executed between the AP for the window system and the AP for the non-window system as the function of the operating system or the window system switches the AP. When the window system program and the AP for the window system operated in the high-resolution display hardware access the display hardware, the first display hardware selection means selects to access the high-resolution display hardware from the CPU by means of the CPU selection circuit. Meanwhile when the AP for the non-window system corresponding to the standard-resolution display hardware accesses to the display hardware, the first display hardware selection means selects to access to the standard-resolution display hardware from the CPU by means of the CPU selection circuit. The display hardware corresponding to each of the programs is always selected by control of the first display hardware selection means, so that the window system and the AP for the window system operated in the high-resolution display hardware and the AP for the non window system operated in the standard-resolution display hardware can be executed in parallel.

On the other hand, the second display hardware selection means is controlled by a picture switching controller for switching a picture displayed in the display between a picture of the AP for the window system and a picture of the AP for the non-window system as the function of the operating system or the window system when the picture switching controller switches the picture. When a picture of the window system is displayed, the second display hardware selection means selects to display an output of the high-resolution display hardware in the display by means of the display Selection circuit. Meanwhile, when a picture of the AP for the non-window system is displayed, the second display hardware selection means selects to display an output of the standard-resolution display hardware in the display by means of the display selection circuit. The picture of the window system operated in the high-resolution display hardware can be displayed in the display by control of the second display hardware selection means without influence from the first display hardware selection means.

The window display means periodically develops text data and graphics data established in the VRAM as a graphics image by accessing the standard-resolution display hardware by the AP for the non-window system corresponding to the standard-resolution display hardware, to transfer and display the developed data in the window established in the high-resolution display hardware by means of the graphics function of the window system. Thus the operation is made as if the AP for the non-window system produces a display in the window. As described above, according to the present invention, since direct access can be made to the standard-resolution display hardware even when the existing AP for the non-window system makes a display using the graphics display system, it is not necessary to perform the emulation process of the CPU requiring complicated control, and accordingly, high speed graphics display in the window can be attained. Further, since the AP for the non-window system corresponding to the standard-resolution display hardware is displayed in the window established in the high-resolution display hardware, it is possible to display the whole display screen in the window at one time and the AP can be operated without scrolling thereof.

DESCRIPTION OF PREFERRED EMBODIMENT

An embodiment of the present invention is now described with reference to the accompanying drawings.

Figure 1:
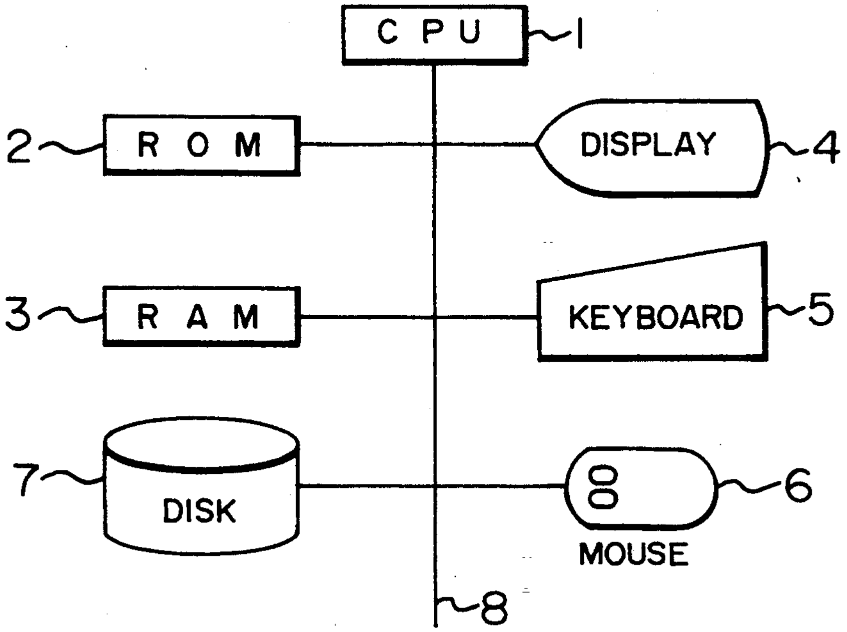
FIG. 1 is a block diagram of a typical system to which the present invention is applied.

FIG. 1 schematically illustrates a typical system configuration for implementing the present invention. Numeral 1 denotes a CPU, 2 a ROM, 3 a RAM, 4 a display unit, 5 a keyboard, 6 a mouse, 7 a disk apparatus, and 8 a system bus. A high-resolution display hardware, a standard-resolution display hardware, a display selection circuit and a CPU selection circuit, which are described later, are a control circuit constituting a part of the display unit 4. Similarly, first display hardware selection means, second display hardware selection means, and window display means which are described later are constituted by a control program which is stored in the ROM 3 or RAM 4 and executed by the CPU. Further, an operating system, a window system, an application program for the window system and an application program for a non-window system are also constituted by a program stored in the ROM 3 or RAM 4 and executed by the CPU.

Figure 2:
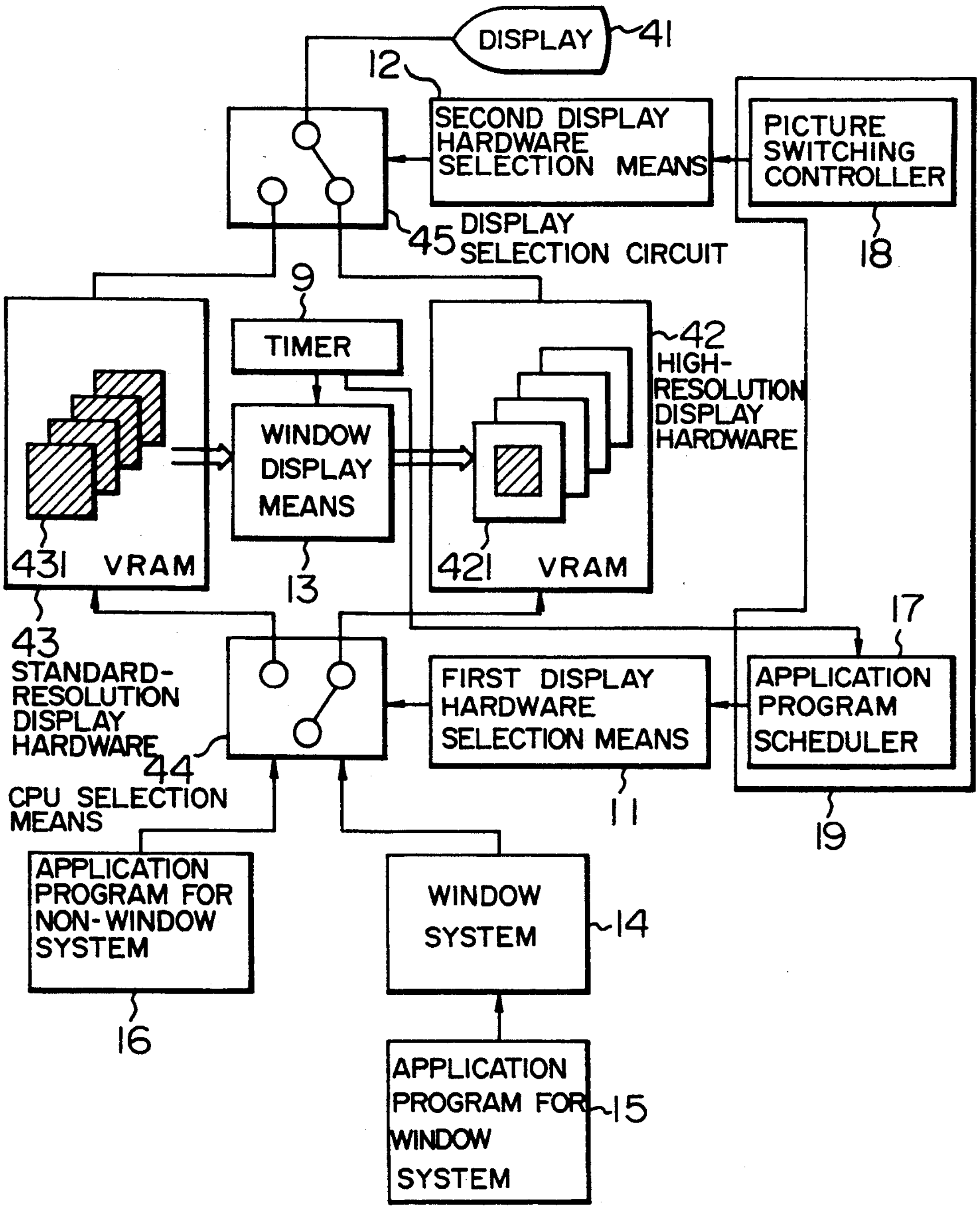
FIG. 2 is a block diagram schematically illustrating the whole configuration of an embodiment of the present invention.

FIG. 2 schematically illustrates the whole configuration of the embodiment. Numeral 41 denotes a display, 42 a high-resolution display hardware, 421 a VRAM in the high-resolution display hardware, 43 a standard-resolution display hardware, 431 a VRAM in the standard-resolution display hardware, 44 a CPU selection circuit, 45 a display selection circuit, 9 a timer, 11 first display hardware selection means, 12 second display hardware selection means, 13 window display means, 14 a window system, 15 an application program for a window system, 16 an application program for a non-window system, 17 an application program scheduler of the operating system or the window system, and 18 a picture switching controller. Only the VRAM 421 or 431 is shown in each of the display hardwares in FIG. 2, while a known display control circuit (usually named a CRC controller) and a drawing control circuit are also included in the display hardware. Both of the display hardwares convert VRAM data into an image signal to display it in the display 41.

In the embodiment, the high-resolution display hardware 42 is utilized in order that the window system 14 and the application program 15 for the window system display data, while the standard-resolution display hardware 43 is standardized heretofore in the personal computer or the like are utilized in order to make display of the existing application program 16 for the non-window system. Switching of a display picture between a picture of the window system 14 and a picture of the application program 16 for the non-window system is made by the picture switching controller 18 in accordance with the user's designation. Further, the application program 15 for the window system and the application program 16 for the non-window system are operated in parallel while being switched in the time slice manner by the application program scheduler 19. The first display hardware selection means 11 is controlled when the application program scheduler 17 switches the application program and selects the display hardware corresponding to the application program to be executed next by means of the CPU selection circuit 44 so that the display hardware can be accessed from the CPU 1. The switching controller 18 and the scheduler 17 are included in the operating system 19 running in the CPU 1.

On the other hand, the second display hardware selection means 12 is controlled by the picture switching controller 18 when switching of the display picture is made between the window system 14 and the application program 16 for the non-window system in accordance with the user's designation, and selects any one of the display hardwares corresponding to the picture to be next displayed by means of the display selection circuit 45 so that an output thereof is displayed in the display 41.

Figure 3:
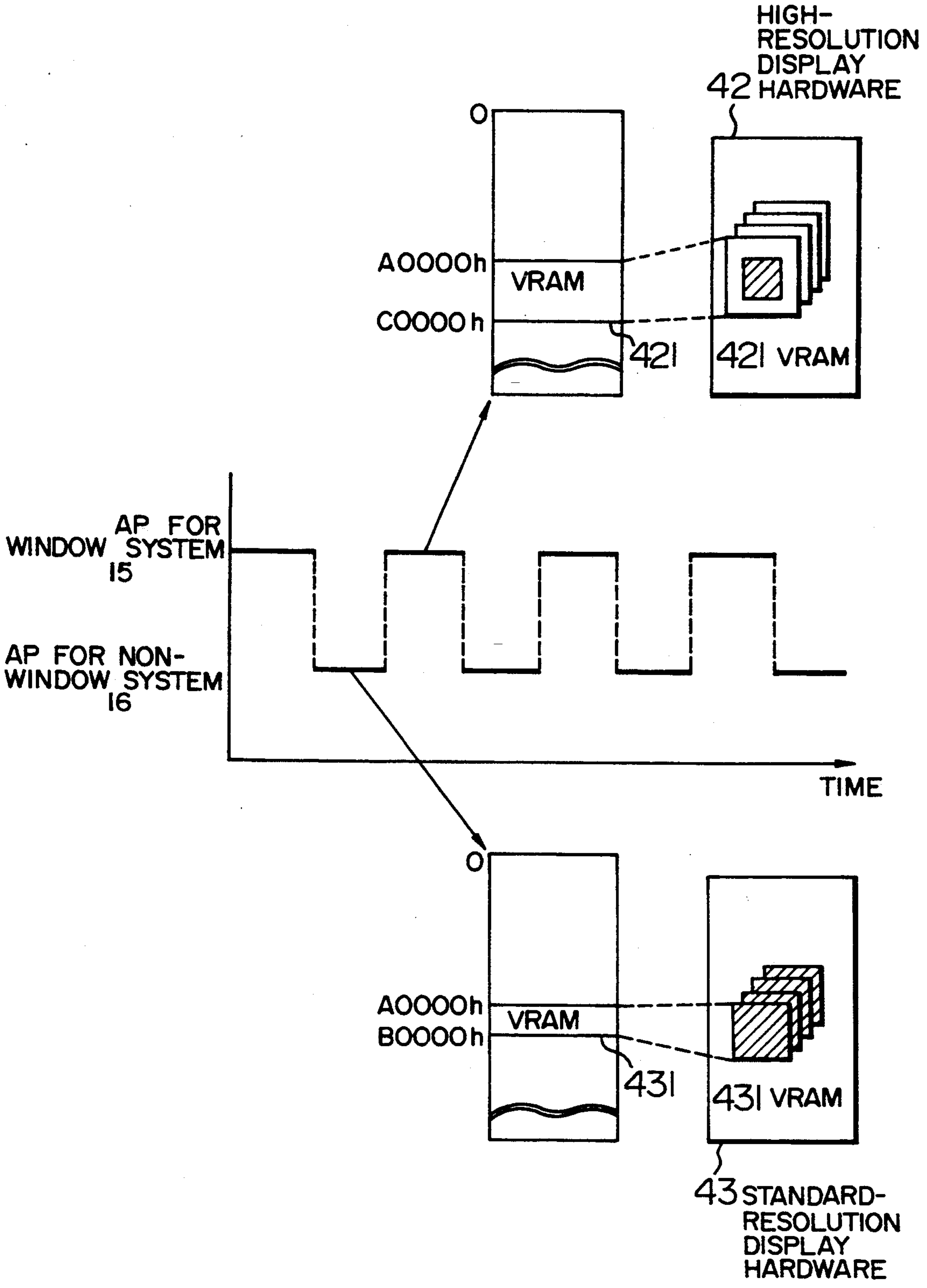
FIGS. 3 and 4 schematically illustrate time slice operation of window display according to the present invention.

FIG. 3 is a timing chart showing an execution state of the application programs, memory maps and display systems accessible from the application programs in case where the respective application programs are executed.

As shown in FIG. 3, the application program 15 for the window system and the application program 16 for the non-window system are executed in parallel while being switched at intervals of sufficiently short time in the time slice control manner by the scheduler 17. Thus, the user can understand as if a plurality of application programs are executed simultaneously.

When the application program 15 for window system is executed, the high-resolution display hardware 42 is selected by the CPU selection circuit 44 so that the window system 14 can access to the high-resolution display hardware 42. In the memory map as viewed from the CPU 1, mapping of the VRAM 421 is made in addresses A0000h to BFFFFh. The application program 15 for the window system accesses to the VRAM 421 to display a picture.

Further, when the application program 16 for the non-window system is executed, the standard-resolution display hardware 43 is selected by the CPU selection circuit 44 so that the application program 16 for the non-window system can access the standard-resolution display hardware 43. In the memory map as viewed from the CPU 1, mapping of the VRAM 431 is made in addresses A0000h to AFFFFh. The application program 16 for the non-window system accesses the VRAM 431 to display a picture.

Figure 4:
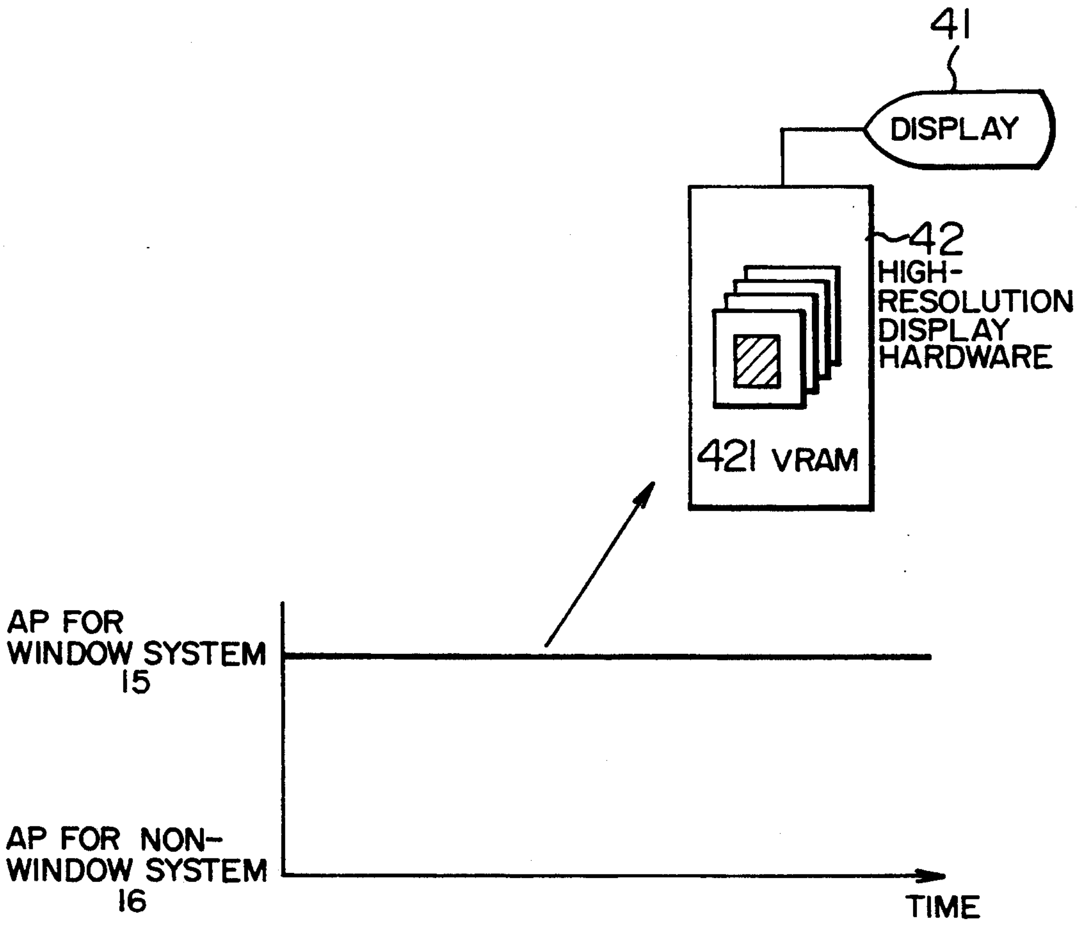

On the other hand, FIG. 4 is a timing chart showing an execution state of the application programs and a display state of the display 14 when the respective application programs are executed.

When a display picture is switched to a picture of the window system 14 in accordance with the user's designation, the display selection circuit 45 is established so that the high-resolution display hardware 42 is selected by the second display hardware selection means 12, and a picture of the window system 14 is displayed in the display 41. Accordingly, as shown in the Figure, even when the application program 16 for the non-window system is executed, the second display hardware selection means 12 establishes the display selection circuit 45 to select the high-resolution display hardware 42 and controls so that a picture of the window system 14 is displayed in the display 41 continuously.

Figure 5:
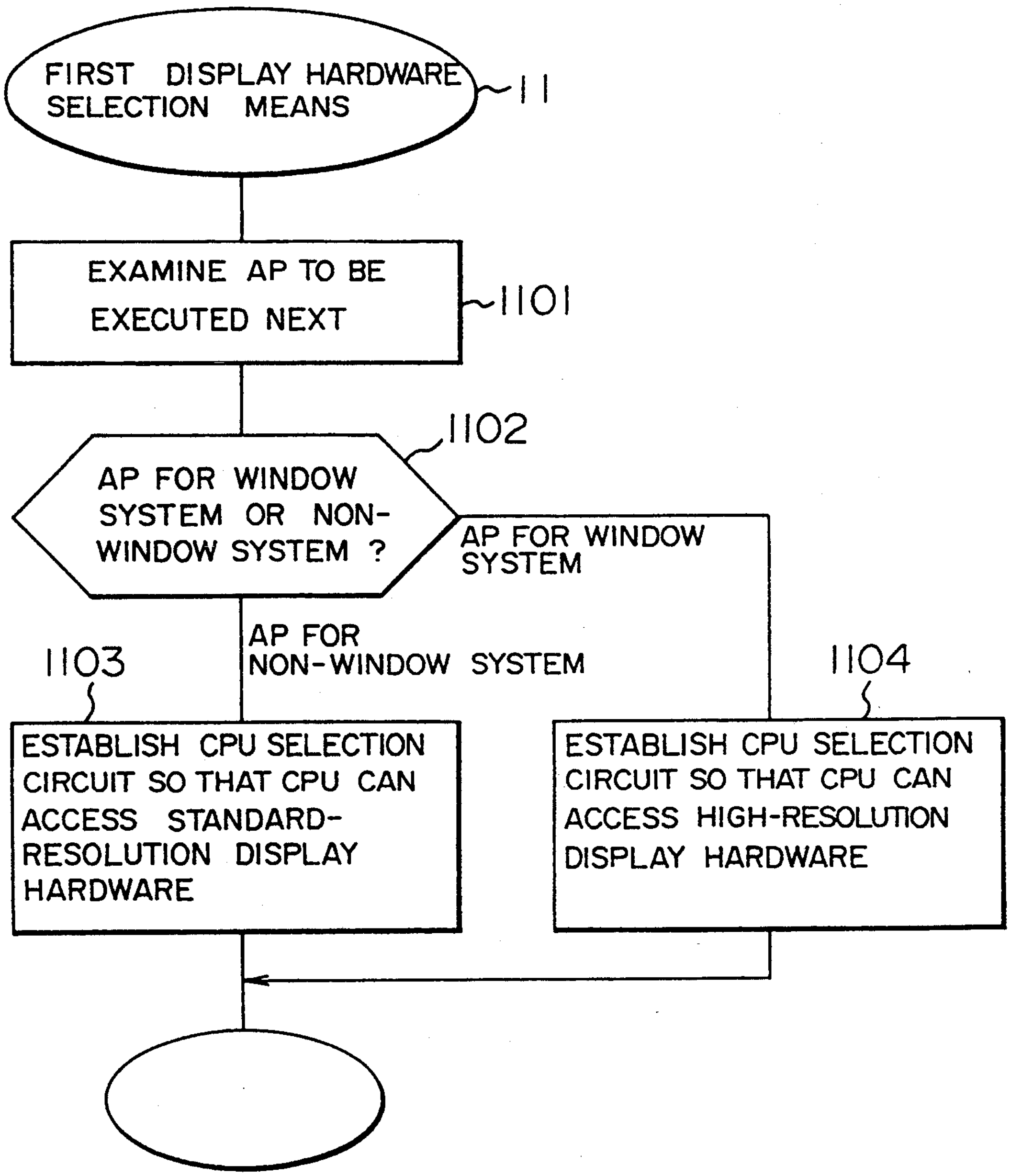
FIG. 5 is a flow chart showing a process of first display hardware selection means of FIG. 1.

Referring now to the flow chart of FIG. 5, procedure of control of the first display hardware selection means 11 is described. When the first display hardware selection means 11 is controlled by the application program scheduler 17 when the application program to be executed is switched, the first display hardware selection means 11 obtains information from the scheduler 17 to examine the application program to be executed next (step 1101) and Judges whether the application program to be executed next is the application program 15 for the window system or the application program 16 for the non-window system (step 1102). If the application program to be executed next is the application program 16 for the non-window system, the CPU selection circuit 44 is established so that the application program 16 for the non-window system can access the standard-resolution display hardware 43 (step 1103). If the application program to be executed next is the application program 15 for the window system, the CPU selection circuit 44 is established so that the window system 14 can access the high-resolution display hardware 42 (step 1104).

Figure 6:
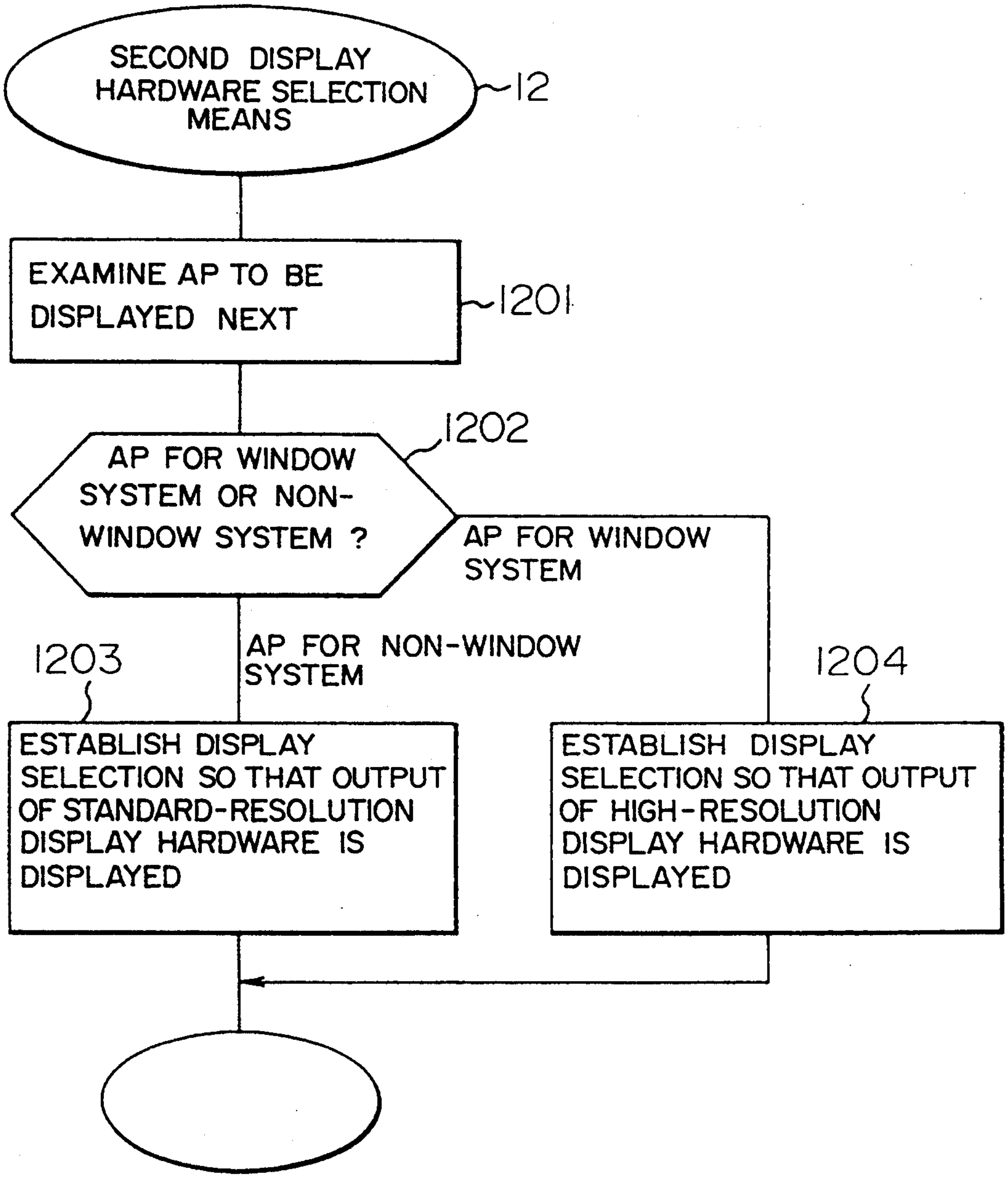
FIG. 6 is a flow chart showing a process of second display hardware selection means of FIG. 1.

Referring now to FIG. 6, procedure of control of the second display hardware selection means 12 of FIG. 2 is described.

When the second display hardware selection means 12 is controlled from the picture switching controller 18 when a picture of the application program to be displayed is switched, the second display hardware selection means 12 obtains information from the picture switching controller 18 to examine the application program for executing display with respect to the display 14 (step 1201) and judges whether the application program to display next is the application program 15 for the window system or the application program 16 for the non-window system (step 1202). If the application program to execute the display is the application program 16 for the non-window system, the display selection circuit 45 is established so that an output of the standard-resolution display hardware 43 is displayed in the display 41 (step 1203). If the application program to execute display is the application program 15 for the window system, the display selection circuit 44 is established so that an output of the high-resolution display hardware 42 is displayed in the display 41 (step 1204).

The window display means 13, which receives an output signal of the timer 9 when running of other application program is scheduled, is started periodically by control of the timer 9. Text data or graphics data accessed to the standard-resolution hardware 43 by means of the application program 16 for the non-window system and established in the VRAM 431 is transferred in the window established in the VRAM 421 of the high-resolution display hardware 42 by the window display means 13 using the graphics function of the window system 14. The process of the window display means 13 will be described in detail.

Figure 7:
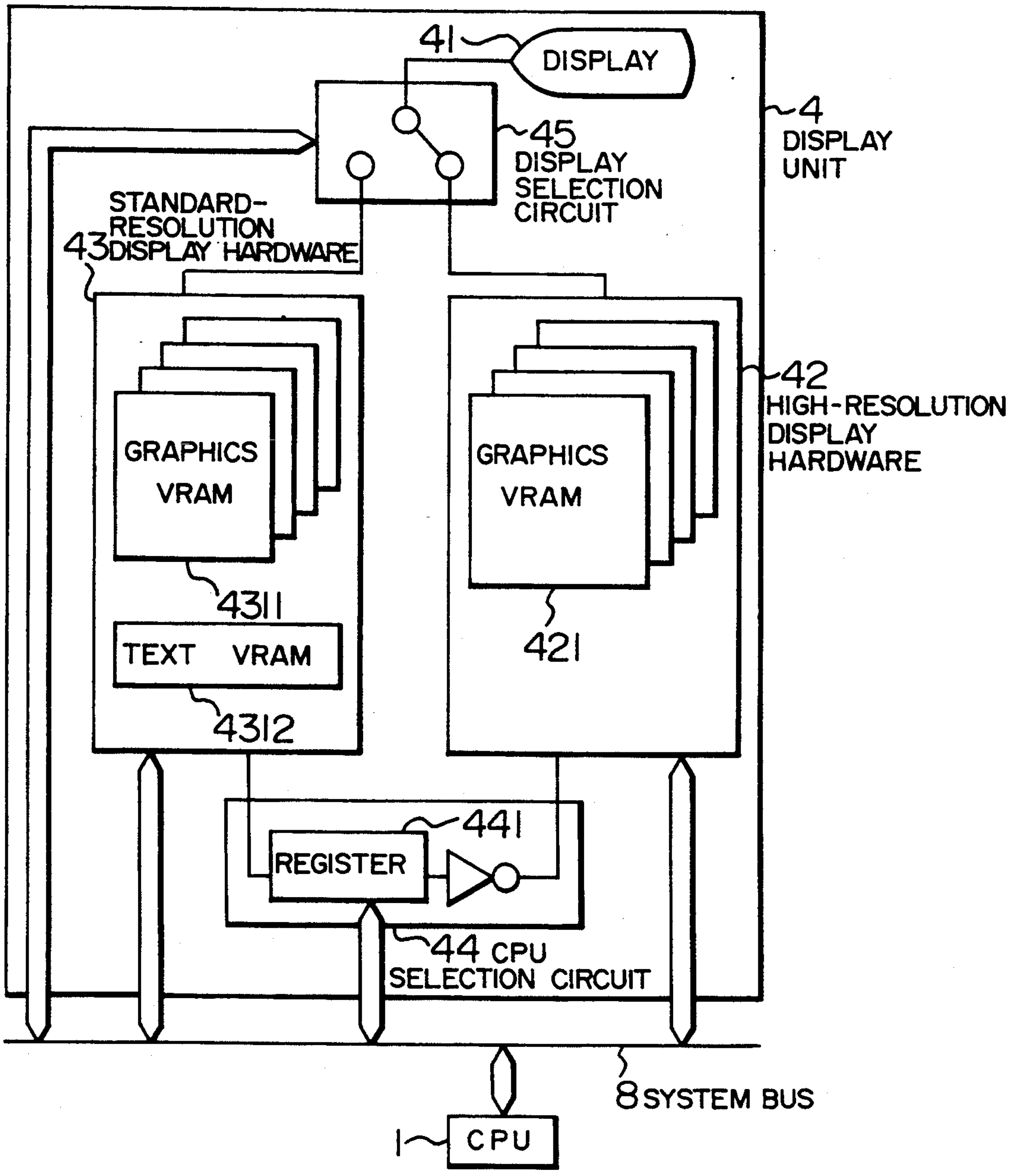
FIG. 7 is a block diagram schematically illustrating a configuration of a display unit of FIG. 2.

FIG. 7 schematically illustrates a hardware configuration of a display unit 4 in the embodiment.

The high-resolution display hardware 42 mainly displays a picture of the window system 14 and provides four 128-KB planes as the internal VRAM 421 for the graphics in order to display a high-resolution picture of approximately 1120×780 dots.

The standard-resolution display hardware 43 displays a picture of the existing application program 16 for the non-window system and provides four 64-KB planes as an internal VRAM 4311 for the graphics in order to display a standard resolution picture of approximately 640×480 dots. Further, the standard-resolution display hardware 43 includes a VRAM 4312 for a text.

Any one of video outputs of the high-resolution display hardware 42 and the standard-resolution display hardware 43 is supplied to the display 41 through a display selection circuit 45. The display selection circuit 45 is composed of a switch circuit, and a 1-bit internal register for selecting the video output can be accessed from the CPU 1 so that a program can select the video output freely.

The high-resolution display hardware 42 and the standard-resolution display hardware 43 each include the function of validating or invalidating an access from the CPU 1 in response to an external signal. The CPU selection circuit supplies the external signal to the respective display hardwares and the state of the 1-bit internal register accessible from the CPU 1 is supplied to the standard-resolution display hardware as it is, and is inverted to be supplied to the high-resolution display hardware 42. That is, when one of them is accessed from the CPU 1, the other can not be accessed, so that the display hardware to be accessed can be selected by a single setting in the program.

Actual control when a picture of the window system 14 is displayed is now described.

Figure 8:
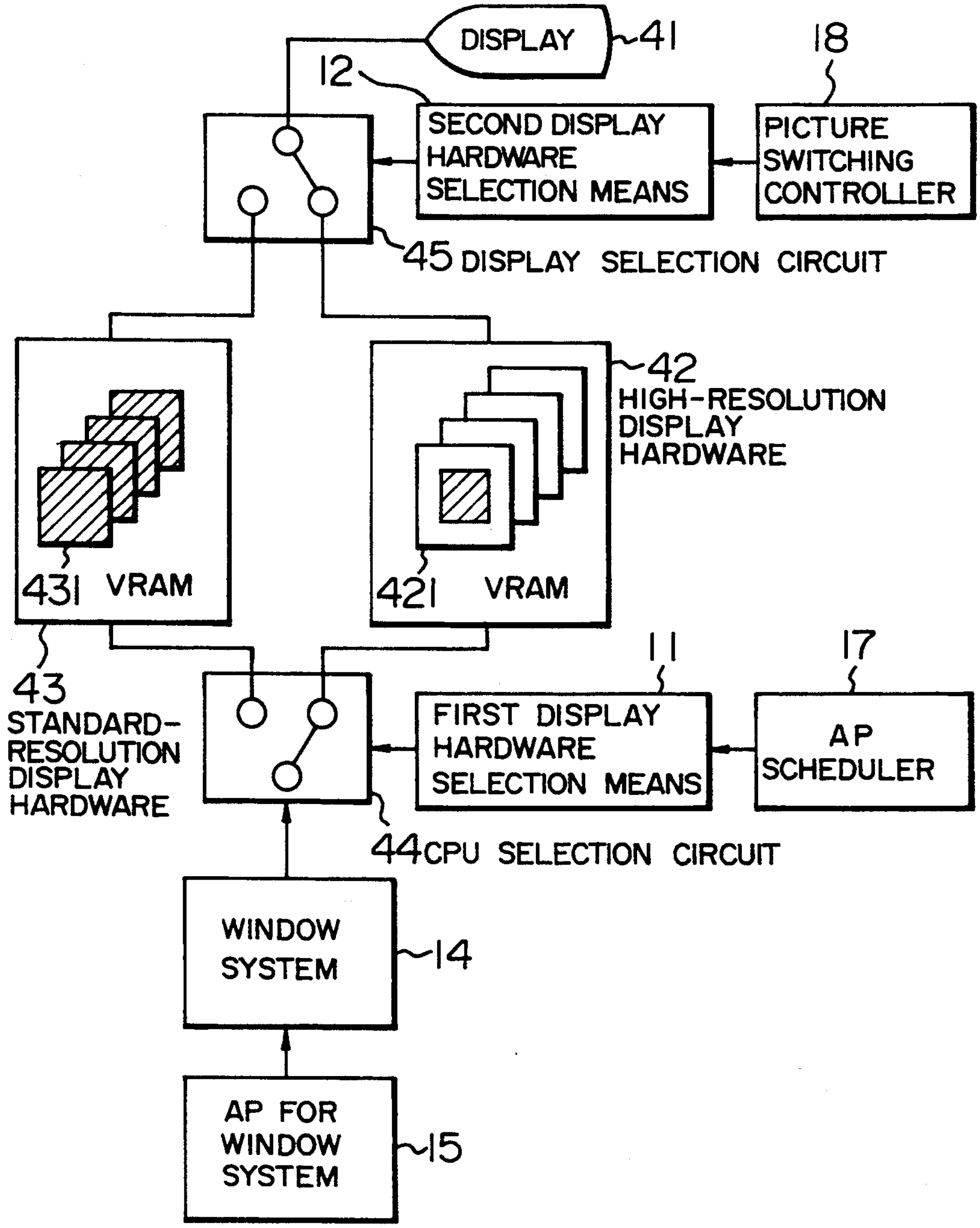
FIG. 8 schematically illustrates the execution state of an application program for a window system of FIG. 1.

FIG. 8 schematically illustrates the state when the window system 14 or the application program 15 for the window system is executed. In this case, the first display hardware selection means 11 is controlled by the application program scheduler 17 when the application program to be executed is switched, and the first display hardware selection means 11 establishes the CPU selection circuit 44 so that the window system can access the high-resolution display hardware 42.

Figure 9:
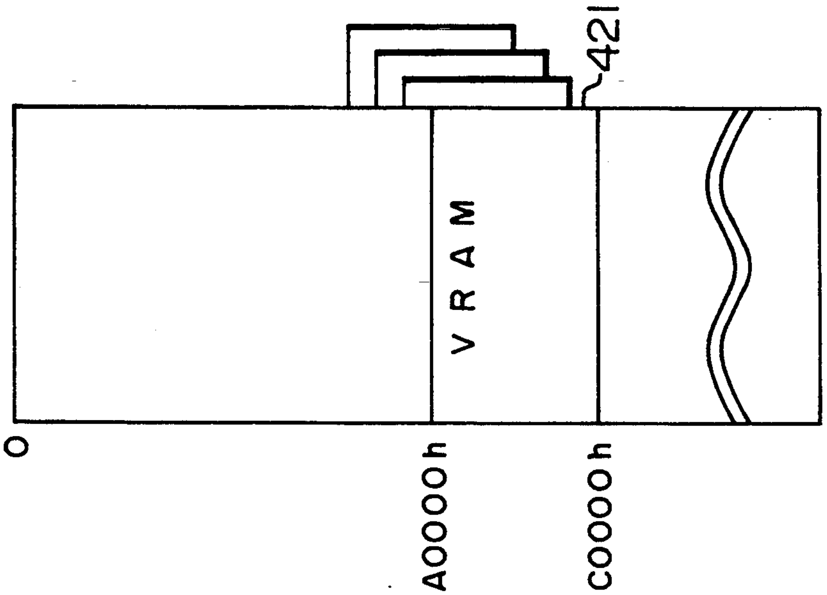
FIG. 9 is a memory map corresponding to the state of FIG. 8.

FIG. 9 shows a memory map as viewed from the CPU 1 when the high-resolution display hardware 42 is selected. The window system 14 accesses addresses A0000h to BFFFFh mapped in the VRAM 421 to make a window display.

The second display hardware selection means 12 establishes the display selection circuit 45 so that the high-resolution display hardware 42 is selected and a picture of the window system 14 is displayed in the display 41.

Figure 10:
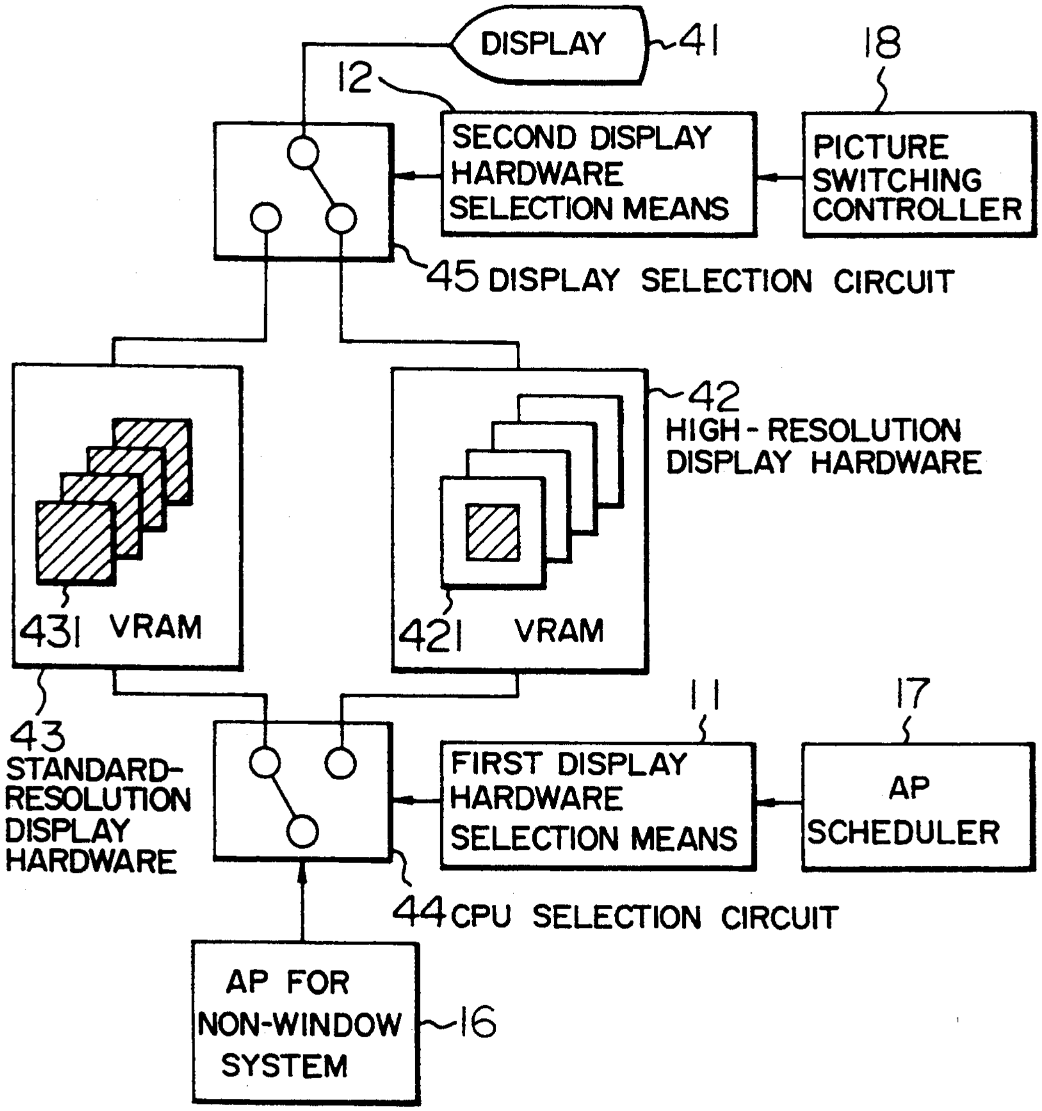
FIG. 10 schematically illustrates the execution state of an application program for a non-window system of FIG. 1.

On the other hand, FIG. 10 schematically illustrates the state when the application program 16 for the non-window system is executed. In this case, the first display hardware selection means 11 is controlled by the application program scheduler 17 when the application program to be executed is switched, and the first display hardware selection means 11 establishes the CPU selection circuit 44 so that the application program 16 for the non-window system can access the standard-resolution display hardware 43.

Figure 11:
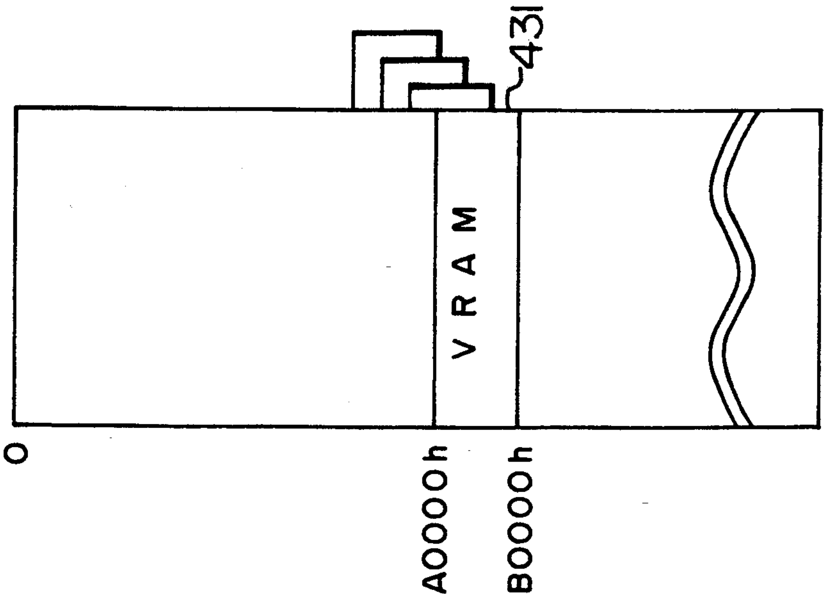
FIG. 11 is a memory map corresponding to the state of FIG. 10.

FIG. 11 shows a memory map as viewed from the CPU 11 when the standard-resolution display hardware 43 is selected. It is different than the memory map of FIG. 9, whereby the VRAM 431 is mapped in addresses A0000h to AFFFFh. The application program 16 for the non-window system accesses the VRAM 431 to display a picture.

Thus, the first display hardware selection means 11 automatically switches the display hardware in accordance with the program to be executed, so that the application program 16 for the non-window system inattentive to the window system 14 can be executed in parallel with the application program 15 for the window system. However, when the window display is made even if the application program 16 for the non-window system is executed, the second display hardware selection means 12 establishes the display selection circuit 45 so that the high-resolution display hardware 42 is selected, and controls so that a picture of the window system 14 is displayed in the display 41 continuously.

Figure 12:
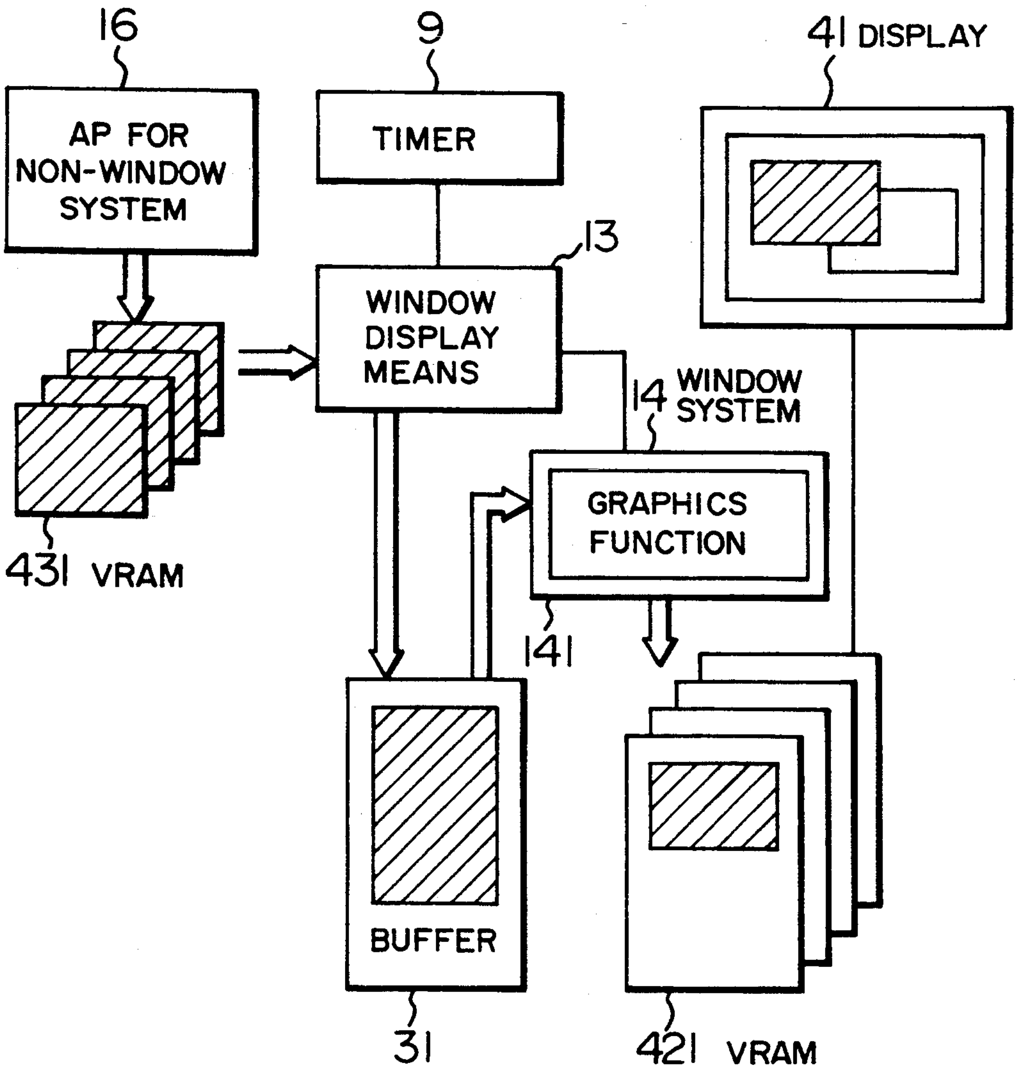
FIG. 12 schematically illustrates control for displaying graphics data on a VRAM of a standard-resolution display hardware in a window of a window system in FIG. 1.

Referring now to FIG. 12, description is made to control displaying of graphics data drawn in the VRAM 431 of the standard-resolution display hardware 43 by the application program 16 for the non-window system in one window of the window system 14. A user will set so that the second display hardware selection means selects the high-resolution display hardware 42.

Figure 13:
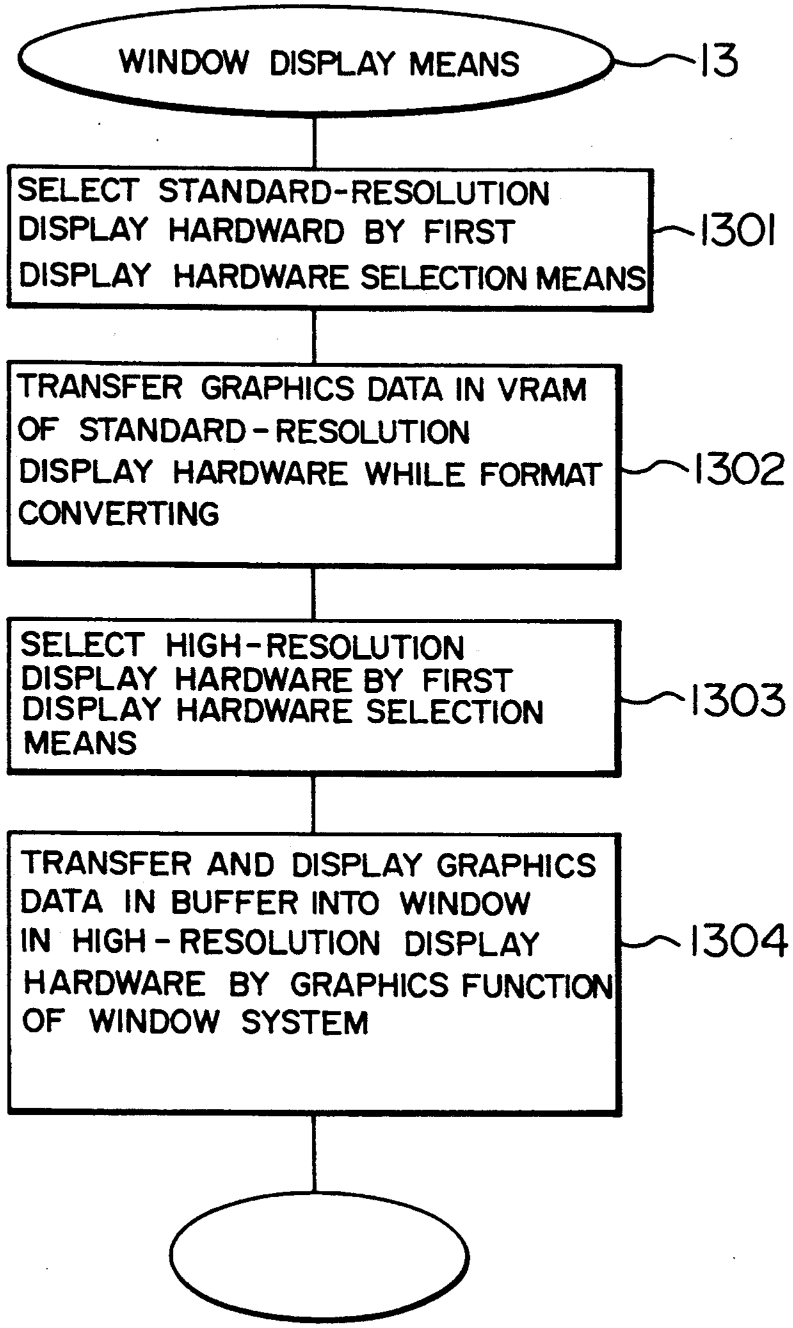
FIG. 13 is a flow chart showing control of the window system of FIG. 12.

The window display means 13 is periodically started by control of the timer 9 at short intervals of several tens msec to several hundreds msec. Referring now to a flow chart of FIG. 13, the processing procedure of the window display means 13 is described. When the window display means 13 is started, the window display means 13 selects the standard-resolution display hardware 43 to be able to access the standard-resolution display hardware 43 by means of the first display hardware selection means 11 (process 1301). The application program 16 for the non-window system accesses the standard-resolution display hardware 43 and takes out graphics data established in the VRAM 431 to transfer the data to buffer 31 in the RAM 3. At this time, the data is converted into a format treated by graphics function 141 of the window system 43 and stored in the buffer 31 (step 1302). Further, the first display hardware selection means 11 is utilized to select so that the high-resolution display hardware 42 can be accessed from the CPU 1 (step 1303). Thereafter, the window display means 13 transfers and displays the graphics data in the buffer 31 to the window established in the VRAM 421 of the high-resolution display hardware 42 by means of the graphics function 141 (step 1304).

As described above, in the embodiment, even when the window system 14 is displayed, the application program 16 for the non-window system is operated as a background program not actually displayed by means of the standard-resolution display hardware 43. The graphics data in the standard-resolution display hardware 43 is developed in the window periodically, so that a picture of the application program 16 for the non-window system can be displayed in the window. In FIG. 3, hatched portion of the VRAM 431 in the standard-resolution display hardware and hatched small memory portion of the VRAM 421 in the high-resolution display hardware indicate the development relationship.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A multi-window system comprising:

a display;

an operating system for controlling execution of an application program of a first type for displaying data on an entire display screen of said display and an application program of a second type forming a multi-window display to display data in a format defined for the multi-window display;

a CPU connected to said display and said operating system for performing processes to display data required to be displayed by said application programs of the first and second types in said display;

said operating system including:

a scheduler for scheduling an application program to be executed by said CPU, and picture switching control means for producing a picture switching signal in accordance with whether the data required to be displayed by a user is designated by the format defined for the multi-window display;

first display hardware including a first VRAM in which data is stored for converting the data into an image signal having a first resolution;

second display hardware including a second VRAM in which data is stored for converting the data into an image signal having a second resolution higher than the first resolution;

first selection means connected to said scheduler for selecting one of said first and second display hardwares in accordance with an application program to be executed next;

data designated to be displayed by an application program started to be executed by said scheduler being input in either of said VRAMs of either one of said selected first display hardware and second display hardware;

second selection means connected to said picture switching control means for connecting one of said first and second display hardwares to said display in accordance with the application program required to display by a user; and window display means, being operated repeatedly at intervals of a predetermined time when a predetermined application program runs in said CPU, for transferring data in said first VRAM into said second VRAM to display the data in multi-window manner;

said picture switching control means controlling so that said second selection means connects said second display hardware to said display when said predetermined application program runs.

2. A multi-window system according to claim 1, wherein said window display means includes a timer which is repeatedly started at intervals of 10 to 500 ms;

a graphics function for the window system; and a buffer for holding data from said first VRAM;

wherein said data is converted into a format for said graphics function in said buffer to be sent to said second VRAM at said intervals of 10 to 500 ms.

3. A multi-window system according to claim 1, wherein said first and second display hardwares include a high-resolution image structure of 1024×768 dots or more and a standard-resolution image structure of about 640×480 dots, respectively.

4. A multi-window system comprising:

a display;

an operating system for controlling execution of an application program of a first type for displaying data on an entire display screen of said display and an application program of a second type forming a multi-window display to display data in a format defined for the multi-window display;

a CPU connected to said display and said operating system for performing processes to display data required to be displayed by said application programs of the first and second types in said display;

first display hardware including a first VRAM in which data is stored for converting the data into an image signal having a first resolution;

second display hardware including a second VRAM in which data is stored for converting the data into an image signal having a second resolution higher than the first resolution;

first selection means connected to said scheduler for selecting one of said first and second display hardwares in accordance with an application program to be executed next;

data designated to be displayed by an application program being input in either of said VRAMs of said either one of said selected first display hardware and second display hardware; and second selection means for connecting one of said first and second display hardwares to said display in accordance with the application program to be displayed next;

wherein data required to be displayed by said application program of said first type is displayed in one of the multi-windows.

5. A multi-window system according to claim 4, further comprising:

a timer which is repeatedly started at intervals of 10 to 500 ms;

a graphics function for the window system; and a buffer for holding data from said first VRAM;

wherein said data is converted into a format for said graphics function in said buffer to be sent to said second VRAM at said intervals of 10 to 500 ms.

6. A multi-window system according to claim 5, wherein said first and second display hardwares include a high-resolution image structure of 1240×768 dots or more and a standard-resolution image structure of about 640×480 dots, respectively.

7. A multi-window system according to claim 4, wherein said first and second display hardwares include a high-resolution image structure of 1240×768 dots or more and a standard-resolution image structure of about 640×480 dots, respectively.

8. A multi-window display method in multi-window environment, said method comprising the steps of:

executing an application program for a window system having high-resolution display hardware and an application program for a non-window system having standard resolution display hardware for producing a display by directly accessing the standard resolution display hardware using entire display picture in parallel in a time slice manner; and transferring and displaying a part or all of a picture, including text and graphics data, of said application program for the non-window system corresponding to the standard-resolution display hardware into a window of a window system operated by the high-resolution display hardware.

9. A multi-window display method according to claim 8, wherein when a window system program and the application program for the window system operated by the high-resolution display hardware access to display hardware, the window system program and the application program for the window system are adapted to access the high-resolution display hardware, while when the application program for the non-window system accesses display hardware, the application program for the non-window system is adapted to access to the standard-resolution display hardware, so that the window system and the application program for the window system operated by the high-resolution display hardware and the application program for the non-window system operated by the standard-resolution display hardware are executed in parallel.

10. A multi-window display method according to claim 8, wherein text data and graphics data established by access of said application program for the non-window system to the standard-resolution display hardware are periodically developed as graphics image and transferred and displayed by the window of the window system operated in high-resolution display hardware.

11. A window system for executing an application program for a window system and an application program for a non-window system simultaneously, comprising:

a CPU for executing said application program for the non-window system, said application program for the window system and a window system program;

high-resolution display hardware corresponding to said application program for the window system;

standard-resolution display hardware corresponding to said application program for the non-window system;

a CPU selection circuit for selecting either one of said first display hardware and second display hardware to be accessed from said CPU;

first display hardware selection means for controlling said CPU selection circuit;

a display common to both said display hardware;

a display selection circuit for supplying an output of any one of both said display hardwares to said display independent of the selection operation of said CPU selection circuit;

second display hardware selection means for controlling said display selection circuit; and window display means for periodically transferring and displaying display data established by access of said application program for the non-window system to the standard-resolution display hardware in window of the window system operated by said high-resolution display hardware.

12. A window system according to claim 11, wherein said second display hardware selection means selects to always display an output of said high-resolution display hardware in said display by means of said display selection circuit regardless of control of said first display hardware selection means when the window system is displayed.

* * * * *